Nov. 27, 1956 T. A. FEDERWITZ 2,771,837
HECTOGRAPHIC ADDRESS DUPLICATING MACHINE
Filed Oct. 30, 1952 13 Sheets-Sheet 1

INVENTOR
THEODORE A. FEDERWITZ
BY Howson & Howson
ATTORNEYS

Nov. 27, 1956 T. A. FEDERWITZ 2,771,837
HECTOGRAPHIC ADDRESS DUPLICATING MACHINE
Filed Oct. 30, 1952 13 Sheets-Sheet 2

INVENTOR
THEODORE A. FEDERWITZ
BY Howson & Howson
ATTORNEYS

Nov. 27, 1956  T. A. FEDERWITZ  2,771,837
HECTOGRAPHIC ADDRESS DUPLICATING MACHINE
Filed Oct. 30, 1952  13 Sheets-Sheet 3

INVENTOR
THEODORE A. FEDERWITZ
BY Howson & Howson
ATTORNEYS

Nov. 27, 1956 T. A. FEDERWITZ 2,771,837
HECTOGRAPHIC ADDRESS DUPLICATING MACHINE
Filed Oct. 30, 1952 13 Sheets-Sheet 4

INVENTOR
THEODORE A. FEDERWITZ
BY Howson
& Howson
ATTORNEYS

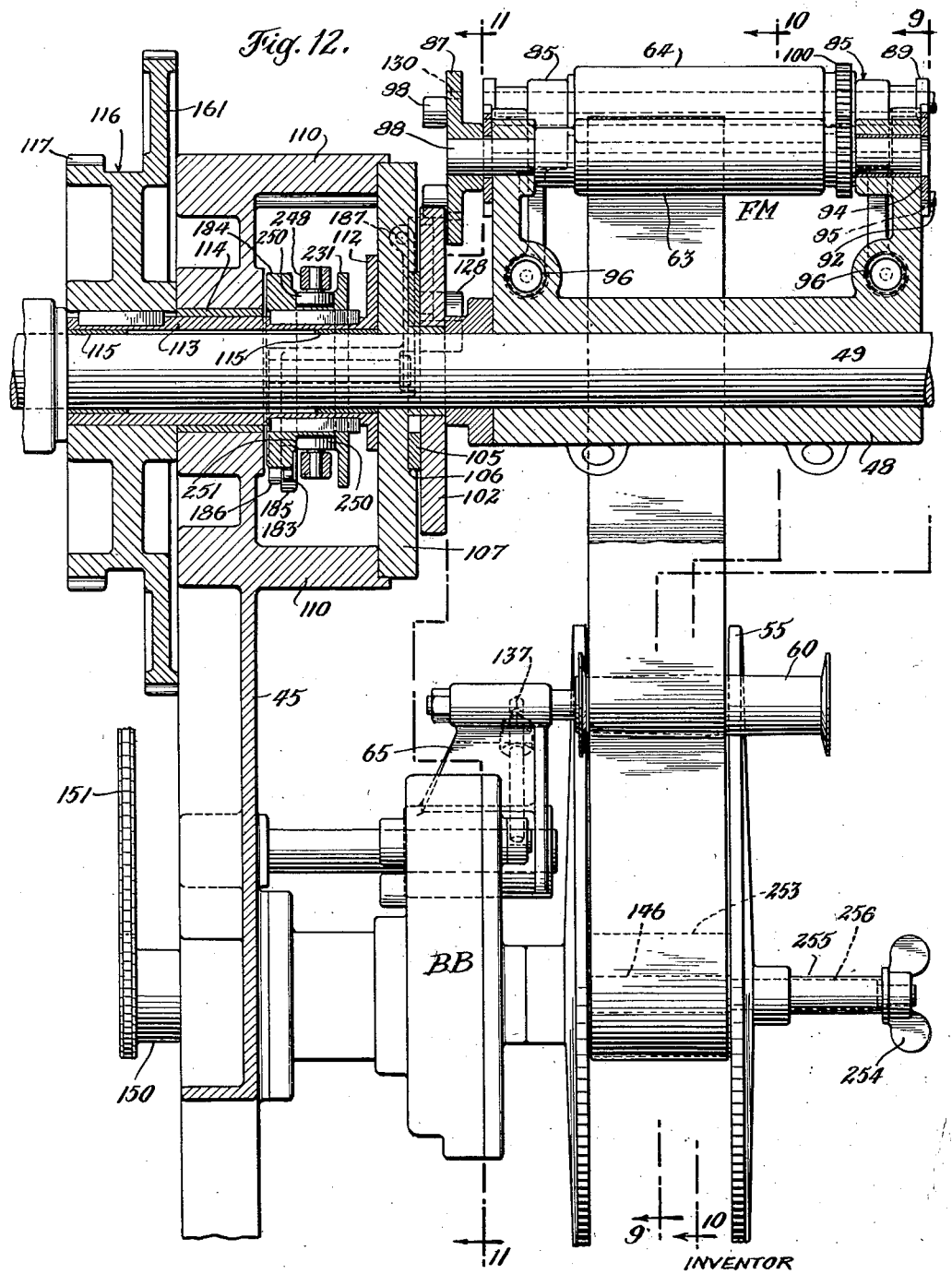

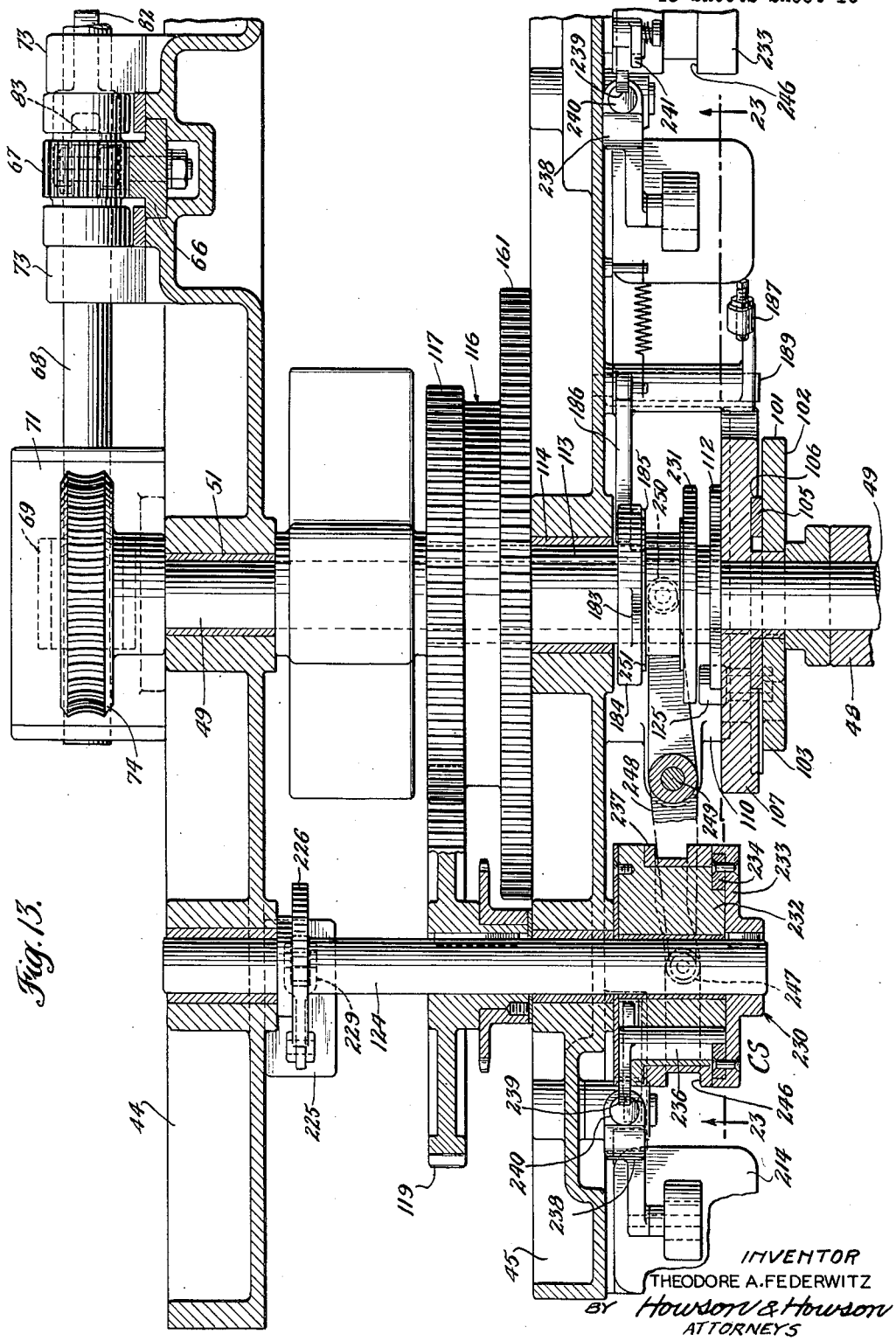

Nov. 27, 1956  T. A. FEDERWITZ  2,771,837
HECTOGRAPHIC ADDRESS DUPLICATING MACHINE
Filed Oct. 30, 1952  13 Sheets-Sheet 11
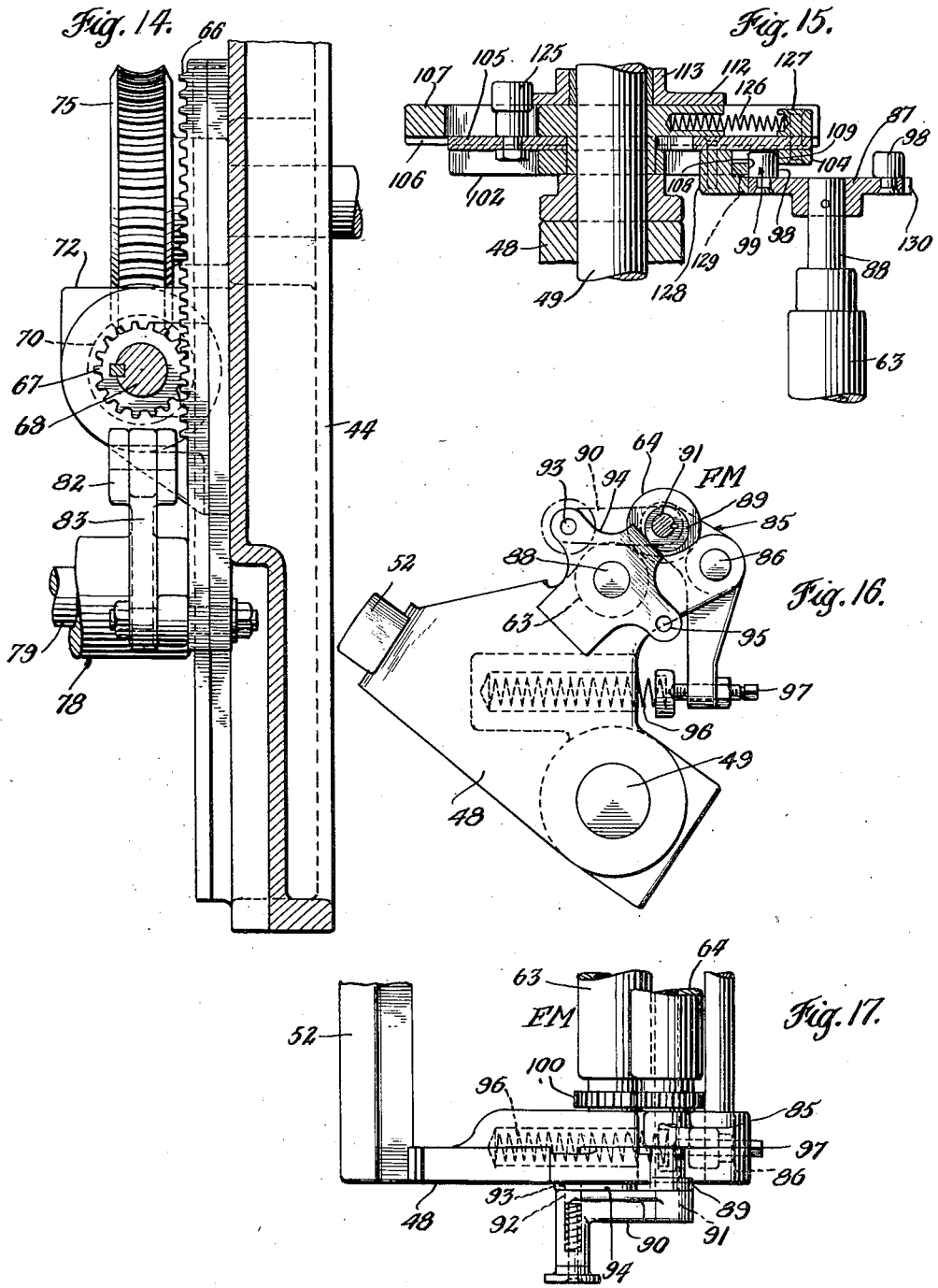
INVENTOR
THEODORE A. FEDERWITZ
BY Howson & Howson
ATTORNEYS Nov. 27, 1956     T. A. FEDERWITZ     2,771,837
HECTOGRAPHIC ADDRESS DUPLICATING MACHINE
Filed Oct. 30, 1952     13 Sheets-Sheet 12

INVENTOR
THEODORE A. FEDERWITZ
BY Howson & Howson
ATTORNEYS

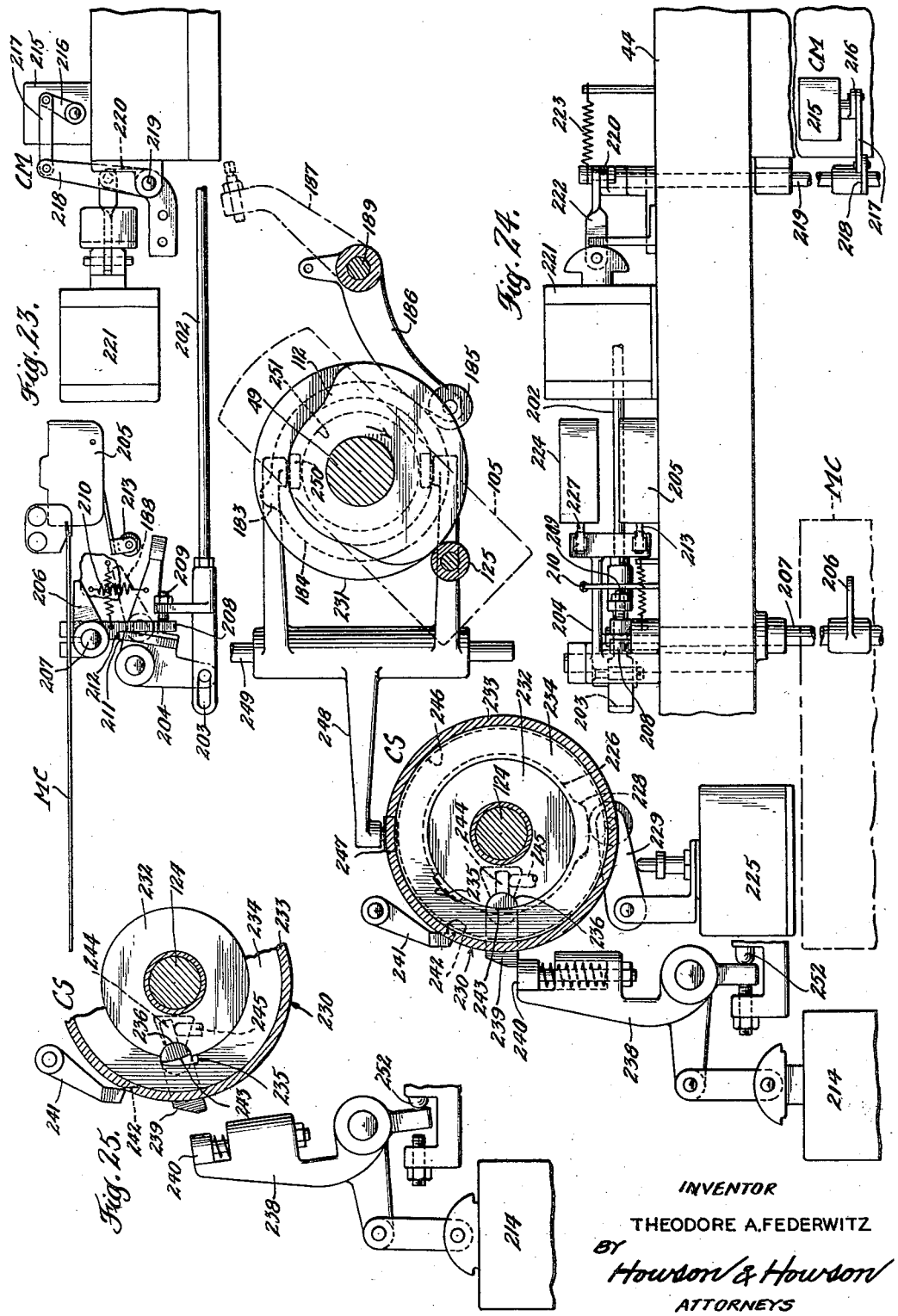

United States Patent Office 2,771,837
Patented Nov. 27, 1956

2,771,837

HECTOGRAPHIC ADDRESS DUPLICATING MACHINE

Theodore A. Federwitz, Philadelphia, Pa., assignor to Scriptomatic, Inc., Philadelphia, Pa., a corporation of Pennsylvania Application October 30, 1952, Serial No. 317,733

7 Claims. (Cl. 101—53)

This invention relates to duplicating machines of the type in which data, such as printed names and addresses are transferred from master record cards to another medium. An example of such a machine is disclosed in my co-pending application, Serial No. 225,591 filed May 10, 1951, in which such transfer is made from master record cards to envelopes, wrappers or sheets of paper, and in which the record cards, stacked in a predetermined geographical or alphabetical order, are carefully handled and run through the machine by means of an intermittently driven gripper conveyor and then delivered accurately to an underfeed stacker such as disclosed in my Patent 2,595,346.

The present invention is primarily concerned with the provision of a machine for effectively transferring printed or typed data from master cards handled in mechanism of the above type onto a tape or paper strip handled on reels with the transfers being made in rapid succession in closely spaced relation on the strip.

The primary object of my invention is the provision of a machine of the above character employing reels for handling the strips and oscillatory mechanism for accomplishing the transfers.

A further object of the invention is the provision of a duplicating machine of the stated type in which holes are punched between successive transfers as the transfers are being made.

A further object of the invention is the provision of a duplicating machine employing a plurality of duplicating units whereby two or more strips may be printed at the same time.

Another object of the invention is the provision of a dual duplicating machine of the stated type whereby two rolls of identically printed strip are produced simultaneously, one of which, may be used for addressing purposes and the other for record purposes.

A further object of the invention is the provision of mechanism for accomplishing step by step feed of the strip from a supply reel to a take-up reel in a manner to accurately advance a predetermined amount of strip with each step.

A further object of the invention is the provision of a duplicating machine of stated type employing moistening, transferring, hole punching and strip feeding mechanism in association with an oscillating head.

A further object of the invention is the provision of a duplicating machine employing two oscillating data transfer units and a common drive mechanism for the two units.

A further object of the invention is the provision in a duplicating machine of the above character of means providing "break" indications on the strip where changes in the data being transferred occur, such as would be the case in transferring addresses when there is a change of city, town or locality.

A further object of the invention resides in the employment of special "break" cards among the master cards and in providing mechanism influenced by the special cards for controlling the strip feeding mechanism of the machine.

A further object of the invention is the provision in a duplicating machine employing oscillating mechanism for effecting transfers, and strip feed mechanism accomplishing strip feed in one direction of oscillation only.

A further object of the invention is to provide mechanism for moistening the strip in one direction of oscillation of the oscillating mechanism only.

A further object of the invention is the provision of a duplicating machine employing an oscillating unit for effecting moistening, transfer of data, and hole punching in one direction of oscillation and strip feed in the other direction of oscillation.

A further object is to provide in a duplicating machine of the character described, brake mechanism for the reels influenced by the paper strip.

A further object is to provide in a duplicating machine of the character described, shiftable cam mechanism under control of special master cards to render the strip punching and strip feeding mechanisms idle.

A further object is to provide in a duplicating machine of the character described, counter mechanism for counting certain transfers but under control of special master cards to prevent counting of other transfers.

Other objects and advantages will be apparent from the specification and drawing in which:

Fig. 12 is a fragmentary cross section taken substantially on the line 12—12 of Figure 9;

Fig. 13 is a fragmentary plan section taken substantially on the line 13—13 of Figure 3;

Fig. 14 is a fragmentary cross section through the rack and pinion drive for the rocker head, the section being taken substantially on the line 14—14 of Figure 3;

Fig. 15 is a detail cross section taken on the line 15—15 of Fig. 10;

Fig. 16 is a detail view of the rocker head and feed roll mechanism;

Fig. 17 is a fragmentary plan view of Figure 16;

Fig. 21 is a fragmentary detail view of a detector mechanism employed in the machine;

Fig. 22 shows the mechanism of Figure 21 in another position;

Fig. 23 is a fragmentary detail sectional view of a cam controlled mechanism and a counter mechanism employed in the machine, the section being taken substantially on the line 23—23 of Figure 13;

Fig. 24 is a plan view of the upper portion of Figure 23; and

Fig. 25 is a fragmentary view showing the cam control mechanism of Figure 23 in another position.

Figure 1:
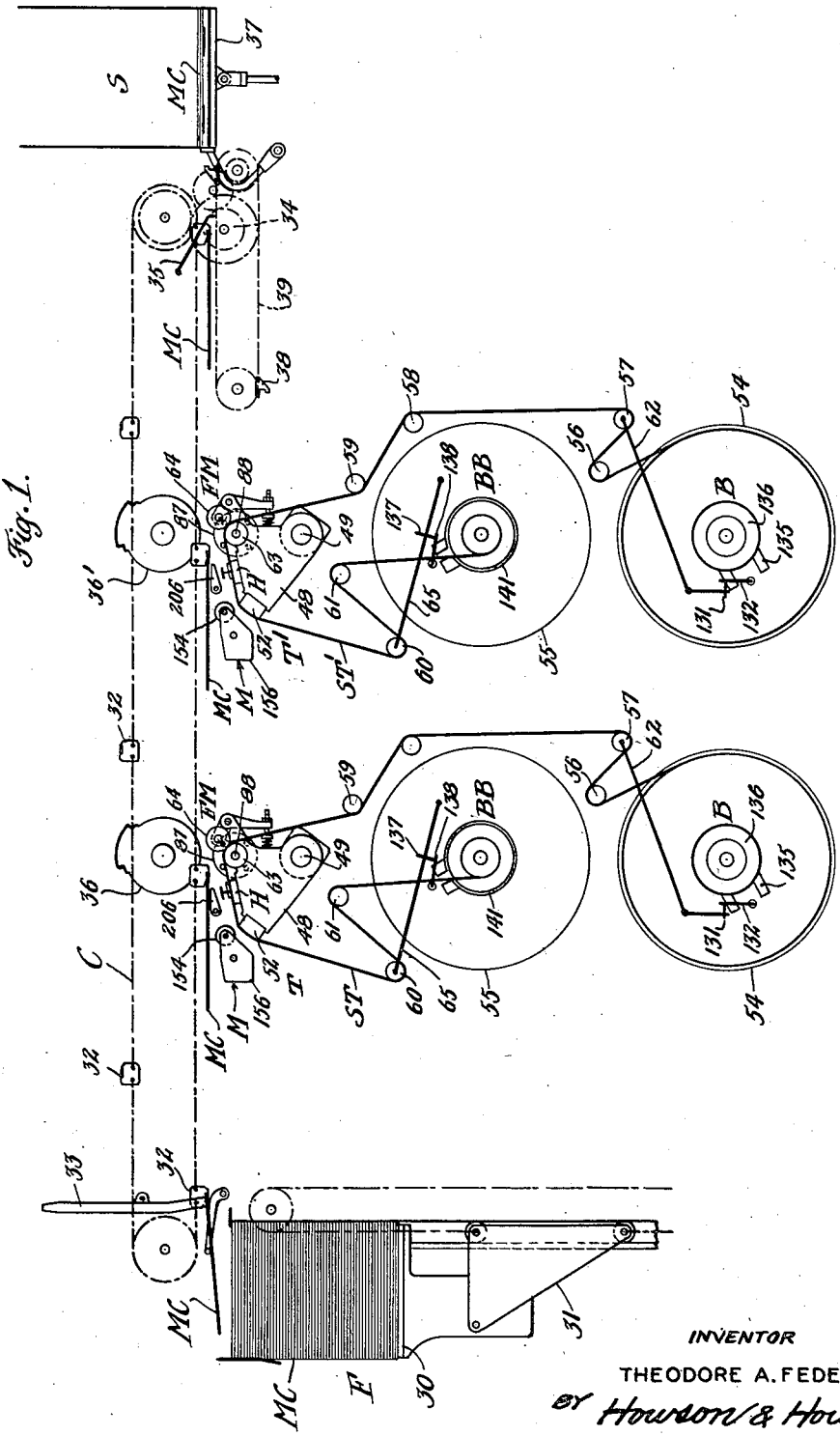
Fig. 1 is a diagrammatic side elevational view of a duplicating machine constructed in accordance with my invention.

The machine of the present invention employs master card handling and stacker mechanism, such as disclosed and claimed in my above application, in association with improved mechanism particularly adapted for transferring data from the master record cards to a tape or paper strip fed from a supply reel to a combined transfer, punching and strip feeding unit, and from thence to a takeup or receiving reel. This unit is adapted to effect transfer of data from master card after master card, onto the paper strip, in closely spaced succession, to punch a hole between successive transfers, and to feed the paper strip in step by step movement through the unit.

In order to provide indications on the paper strip at to where certain data transferred onto the strip ends and different data starts, I provide a break indication, such as a line across the strip by means of special cards, preferably of a different color than the other master cards, properly located in the stack of record cards and having a line thereon which is transferred to the strip when it reaches the transfer unit. This is particularly useful when the machine is used for addressing purposes, in which case, the special cards would be placed in the stack of record cards at points such that the "break" lines will be transferred to the strip to indicate where the addresses change from one city, town, or locality, to another. Mechanism is provided to prevent feed of the strip when "break" lines are being transferred to the strip.

In the preferred embodiment of my invention I employ two like transfer units enabling duplicate strips to be printed from the set of master cards passing through the machine, although in some instances, I may only employ one unit, and in other instances more than two.

In employing two units, both of the receiving reels, onto which the printed strips have been wound, may be used in machines for cutting the strips into individual address slips and for pasting them onto magazines or the like for mailing, or, one reel may be so used and the other may be used for record purposes. In the latter case I prefer to employ paper strips of somewhat greater width for the record strips in order to provide room for notations adjacent the names and addresses and as will be seen hereafter the machine is well adapted for this purpose. In this art the strips which are used for mailing purposes are known as "dick strips" and the strips which are used for record purposes are known as "golly strips".

Referring to the drawings and more particularly to Figures 1 to 8, my improved duplicating machine comprises in general, a master card feeding mechanism F, a gripper conveyor C, a card stacker S, and transfer units T and T¹. Since the transfer units T and T¹ are of like construction, like reference characters have been applied to like parts and the description of one of the units will apply to the other.

Figure 2:
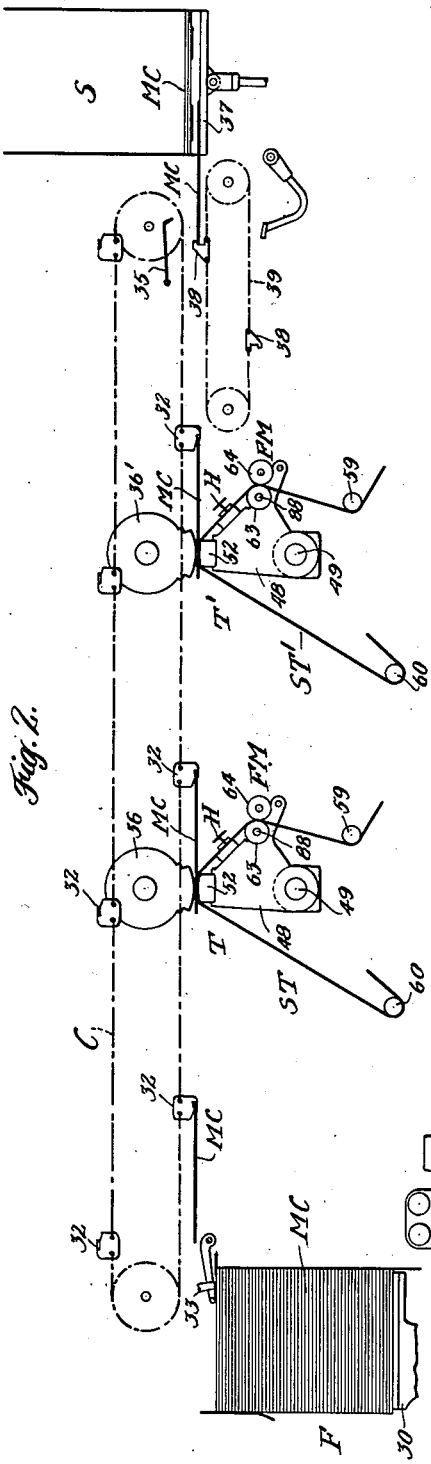
Fig. 2 is a similar diagrammatic view showing the parts in a different position.

The particular card feeding mechanism F, the gripper conveyor C and card stacker S are diagrammatically illustrated in Figures 1 and 2 and are of the type illustrated in my co-pending application and issued patent noted above. In general, the card feeding mechanism F comprises a feed table 30 supported on a vertically movable carriage 31 adapted to be automatically raised in predetermined increments as the master cards MC are fed to the conveyor grippers 32 by means of suction head 33.

The conveyor C is driven in intermittent action by means of a Geneva motion assembly indicated at 34. In Figure 1 the conveyor C is in its position when the suction head 33 has just delivered a master card MC into the card grippers 32. The next card, reading from left to right, is shown near the printing or transfer station of the first transfer unit T, the next card near the printing or transfer station of the second transfer unit T¹ and the last card in position to be released by the grippers and directed against the stop 35.

Figure 2 shows the first card moving away from the feeder F, the second card at the transfer station of the first transfer unit T and being pressed against the strip ST by the pressure drum 36, the third card at the transfer station of the second transfer unit T¹ and being pressed against the strip St¹ by the pressure drum 36¹ and the last card as being pushed onto the stacker table 37 by means of the pusher 38 of the pusher chain 39. The rotary movements of the pressure drums 36 and 36¹ are synchronized with the movements of the conveyor C in accordance with the principle set forth in my pending application aforesaid.

Figure 6:
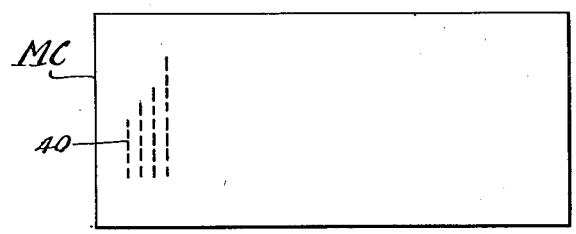
Fig. 6 illustrates one of the master cards employed in the machine.
Figure 7:
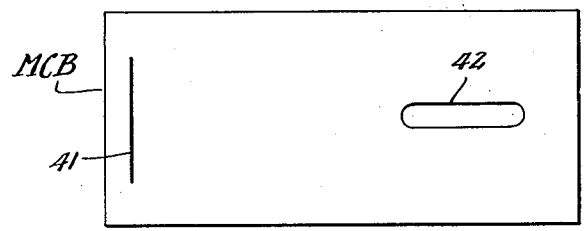
Fig. 7 illustrates a special city or town "break" card employed.

One of the master cards MC is illustrated in Figure 6 with data which is to be transferred to the strips ST and ST¹, indicated at 40. This data is on the underside of the cards as they pass through the machine. In Figure 7 I have illustrated one of the special "break" cards MCB above referred to, with the break line 41 indicated on the card in such position relative to the data on the other cards that it will be transferred to the strip between data transfers 40¹ as indicated at 41¹ in Figure 8. The "break" cards MCB are each provided with an elongated slot 42 for a purpose hereinafter appearing.

My improved machine has a main supporting framework composed of front and rear frame members 43 and 44 and in intermediate frame member 45 from which the transfer units T and T¹ and associated mechanisms are supported. The card feeding mechanism F and the stacker S are preferably constructed as units having frame members 46 and 47 respectively adapted to be suitably attached to the main frame members 43 and 44 at the ends thereof.

Figure 8:
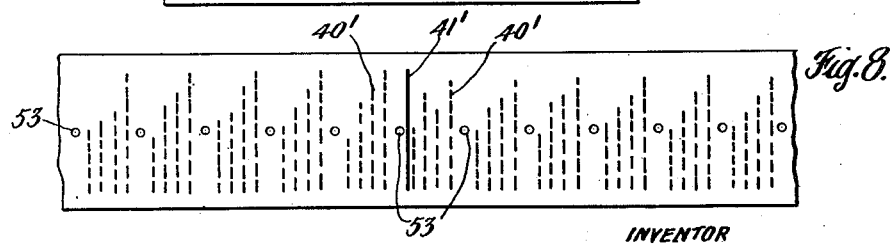
Fig. 8 illustrates a length of the paper strip with transferred printed matter indicated thereon in dotted lines.

Each transfer unit T, T¹ comprises in general a rocker head 48 secured on a transverse rock shaft 49 mounted in bearings 50, 51 in the frame members 43 and 44; feed roll mechanism FM for effecting feed of the strip through the machine; a transfer anvil 52; and a hole punching device H for punching holes 53 in the strip at spaced intervals corresponding to the spacing of the data transfers 40¹, 40¹ as shown in Figure 8.

Associated with the transfer units are the reels and guide rollers for the tape or strip including a lower supply reel 54, an upper take-up or receiving reel 55 and intermediate guide rollers 56, 57, 58, 59, 60 and 61.

In the preferred arrangement the reels 54 and 55 are located below the rocker head with the take-up reel 55 above the supply reel 54. In threading the paper strip into the machine the strip is led from the supply reel over the guide roller 56 (Figure 3), then under the guide roller 57 of the brake control lever 62 of the supply reel, then upwardly and over the guide roller 58, then under the guide roller 59, then between the feed roll 63 and grip roll 64 of the feed roll mechanism FM, then through the hole punching device H, then over the transfer anvil 52, then downwardly and under guide roller 60 of the brake control lever 65 of the take-up reel, then over the guide roller 61 and finally to the take-up or receiving reel 55.

Figure 3:
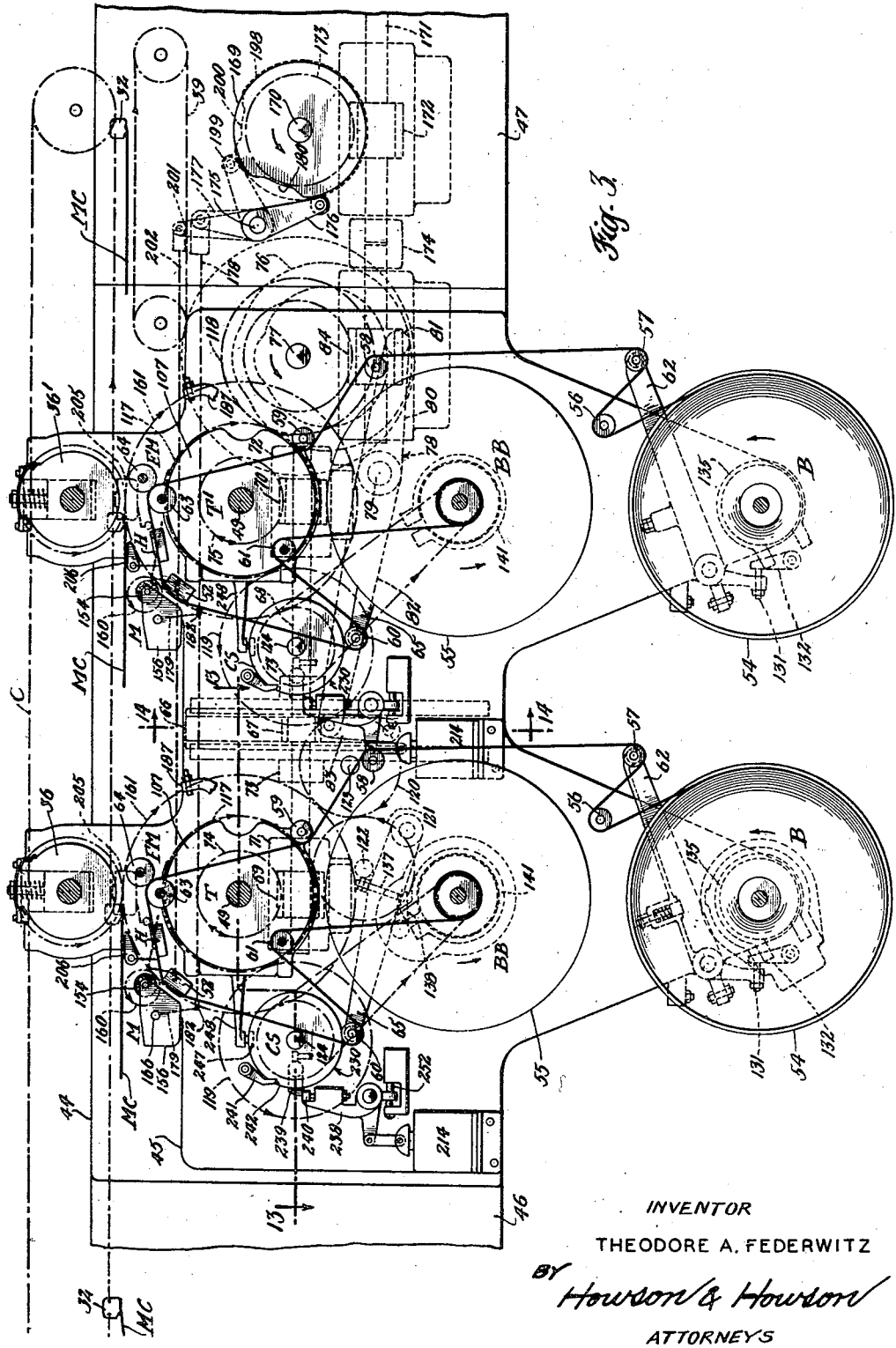
Fig. 3 is a longitudinal vertical section of the machine taken substantially on the line 3—3 of Figure 4 with certain parts omitted and others indicated diagrammatically for the sake of clarity.

The direction of rotation of the reels is indicated by the arrows in Figure 3.

Figure 4:
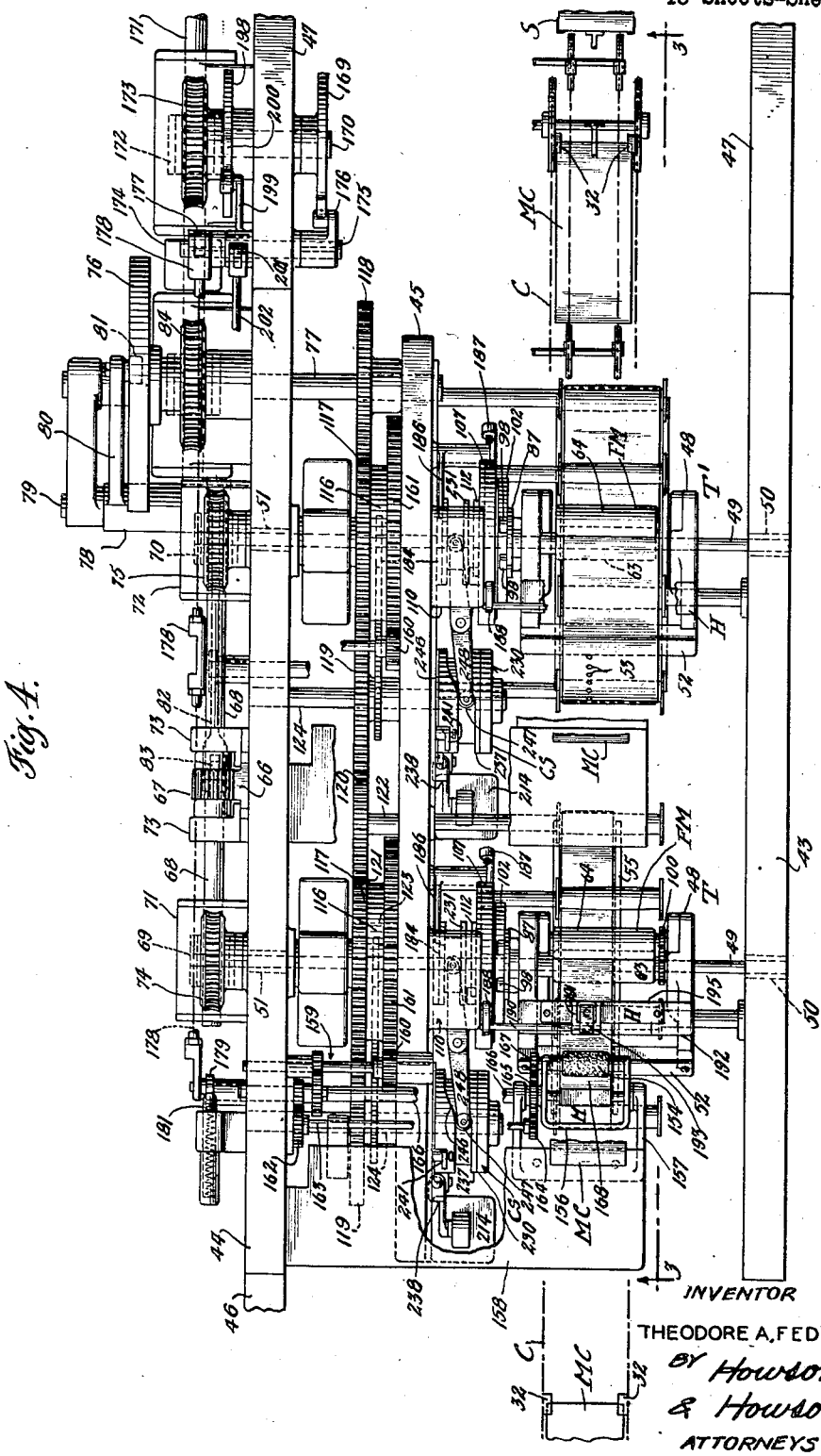
Fig. 4 is a plan view of Figure 3 with certain parts broken away in order to show other parts more clearly.
Figure 5:
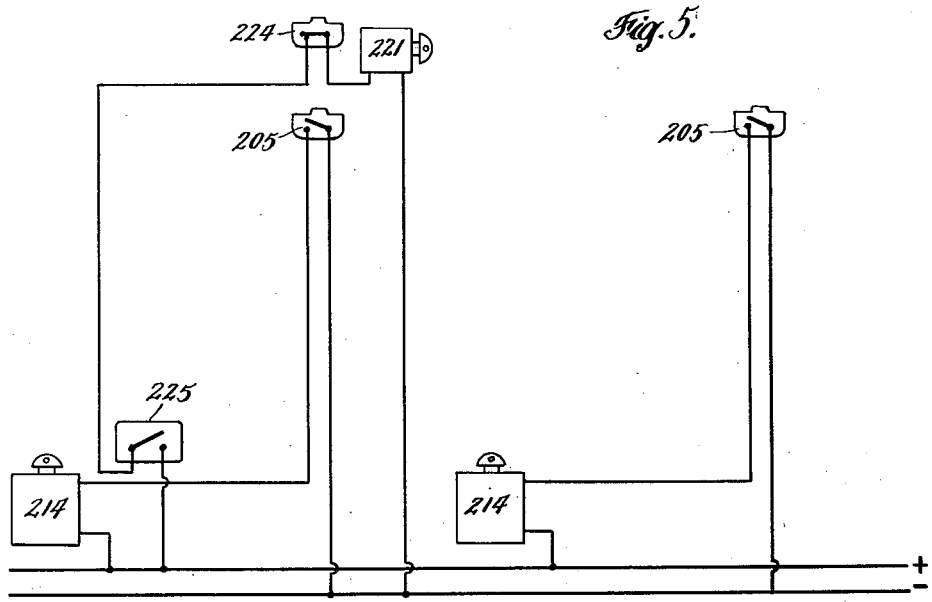
Fig. 5 is a wiring diagram of certain control circuits.
Figure 9:
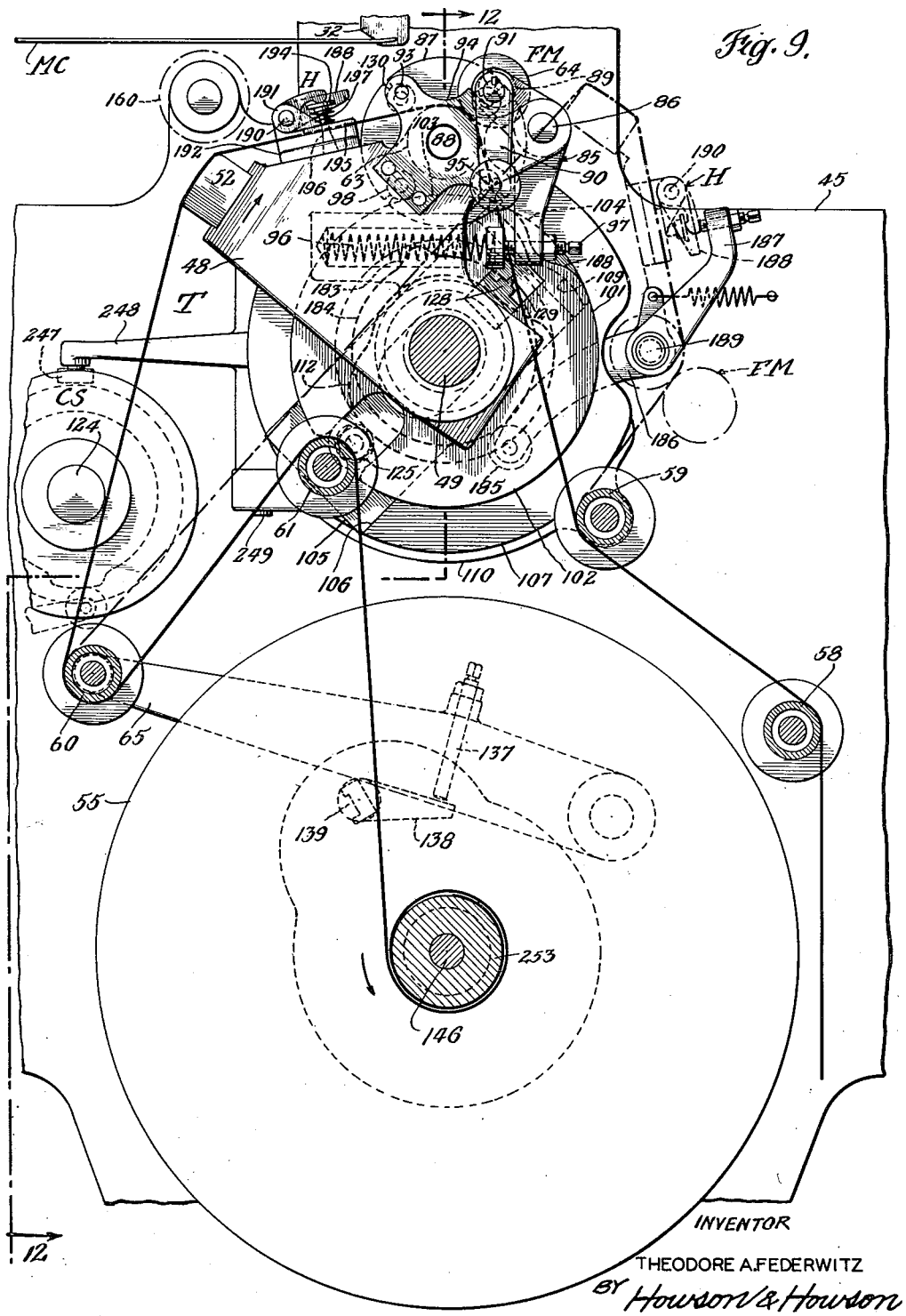
Fig. 9 is an enlarged fragmentary longitudinal section taken substantially on the line 9—9 of Figure 12 with the rocker head of the machine shown in its left hand position in full lines and in its right hand position in dot and dash lines.

The rocker heads 48 of the transfer units T and T¹ are adapted to be oscillated back and forth through 90° as will be seen from inspection of Figure 9 in which the rocker head is shown in its extreme left hand position in full lines and in its extreme right hand position in dot and dash lines. This rocking movement is imparted to the rocker heads by means of a reciprocating rack 66 and meshing pinion 67. The pinion 67 is secured to a shaft 68 extending longitudinally from the unit T to the unit T¹, which shaft has worms 69 and 70 secured thereon adjacent its ends. Suitable bearings are provided for the shaft 68 in the worm housings 71 and 72 secured to the rear frame member 44 and in the bearing blocks 73 secured to the frame member 44 adjacent the pinion 67 as best seen in Figures 3, 4, and 13. The worms 69 and 70 drive the worm wheels 74 and 75 which are secured on the rock shafts 49 of the rocker heads.

Reciprocatory movement is imparted to the rack by means of a cam 76 secured on a transverse shaft 77 and a lever 78 pivoted on the rear frame 44 at 79. The lever has an arm 80 carrying a cam follower 81 and an arm 82 extending toward and connected to the rack 66 by means of a link 83. The cam 76 is rotated by a worm drive 84 and with each revolution of the cam one complete up and down reciprocation is imparted to the rack 66 and one complete oscillation back and forth is imparted to the rocker heads 48 of both units T and T¹.

The operation of the machine is such that feeding of the amount of paper strip required for each successive transfer of data to the strip takes place when the rocker head is moving from right to left as viewed in Figure 3 and that moistening of the strip for transfer purposes, transfer of the data, and punching of the holes take place when the rocker head is moving from left to right. In order to accomplish this the feed rool mechanism FM is constructed and controlled to effect strip feed only in the stroke of the rocker head to the left as will now appear.

The feed roll mechanism FM comprises the feed roll 63 rotatably mounted in bearings in the rocker head 48, the grip roll 64 mounted in bearings in the upper arms of bell crank levers 85 pivoted at 86 in the rocker head, and a feed roll drive wheel 87 secured on the feed roll shaft 88.

When the paper strip is being threaded into the machine the grip roll 64 is moved out of contact with the feed roll 63 by rotating the eccentric 89 to the position shown in Figures 16 and 17. A handle 90 secured on the eccentric shaft 91 is provided to adjust the eccentric and the handle is held in adjusted position by means of its spring plunger 92 engaging in the hole 93 of a plate 94 secured to the rocker arm. After threading of the paper strip is completed the handle 90 is swung downwardly until the plunger 92 engages in the hole 95 of plate 94 as shown in Figure 9. This adjusts the eccentric to a position in which the grip roll 64 engages the paper strip with gripping action under influence of the springs 96 which act against the lower arms of the bell crank levers 85. The pressure of the springs can be adjusted by set screws 97.

The feed roll drive wheel 87 is provided with four evenly spaced cam rollers 98, see Figures 10, 11, 12 and 15 which cooperate with a cam track 99 to cause one quarter of a revolution of the wheel in counterclockwise direction each time the rocker head oscillates to the left. When the wheel rotates the feed roll 63 rotates with it and this in turn causes the grip wheel 64 to rotate in the opposite direction by reason of the gear connection 100 between the rolls thus feeding a length of paper strip through the rolls. In the particular machine illustrated these parts are so proportioned that one inch of strip is fed with each one quarter revolution of the drive wheel 87.

Figure 11:
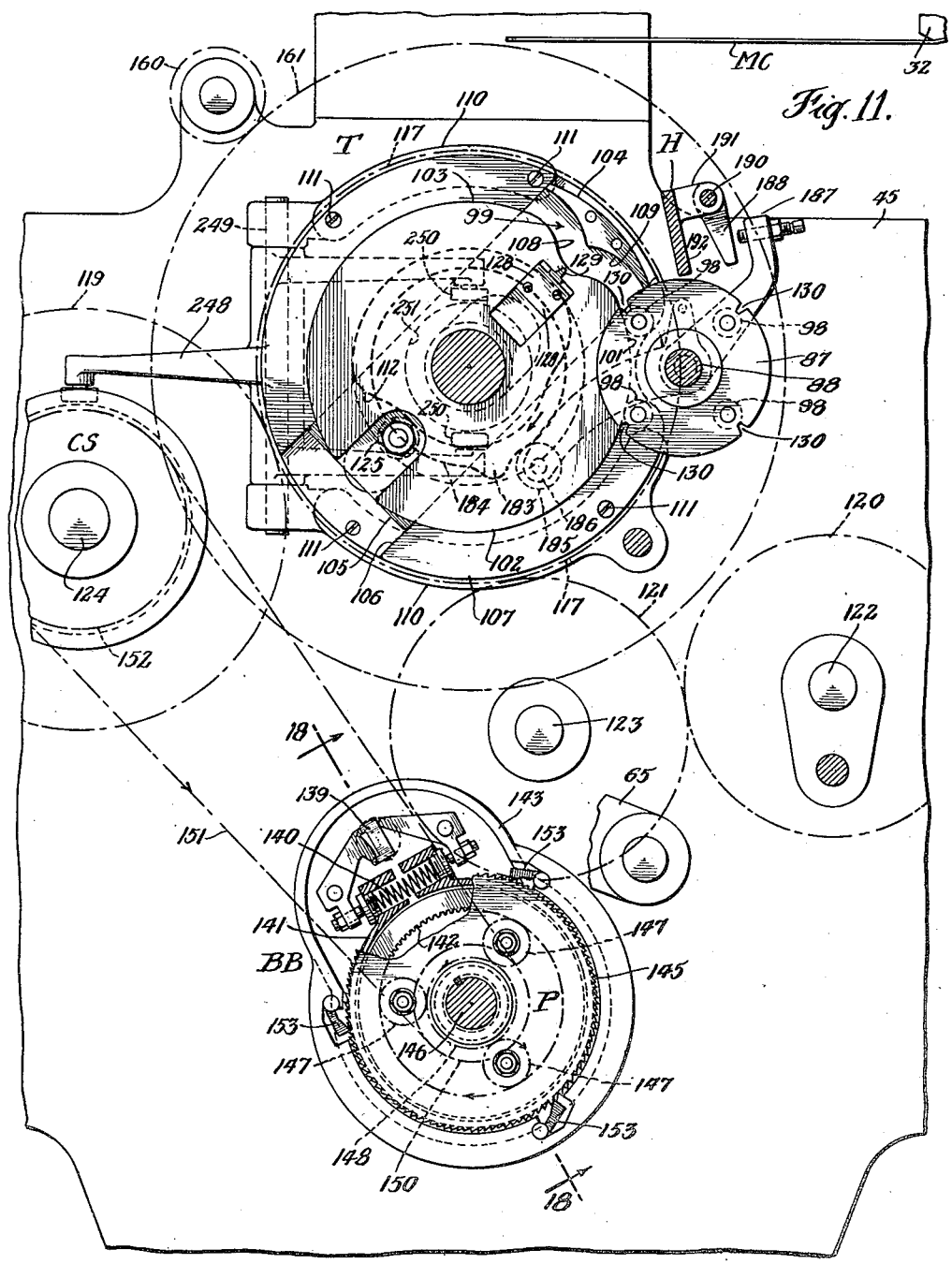
Fig. 11 is a fragmentary longitudinal section taken substantially on the line 11—11 of Figure 12 with the parts shown in the position they assume when the rocker head has moved to its extreme right hand position.

In Figure 11 the rocker head is shown in its extreme right hand position and it will be noted that in this position two of the cam rollers 98 of the wheel 87 are in contact with the concentric portion 101 of the member 102 so that the feed roll 63 is held against rotation.

Figure 10:
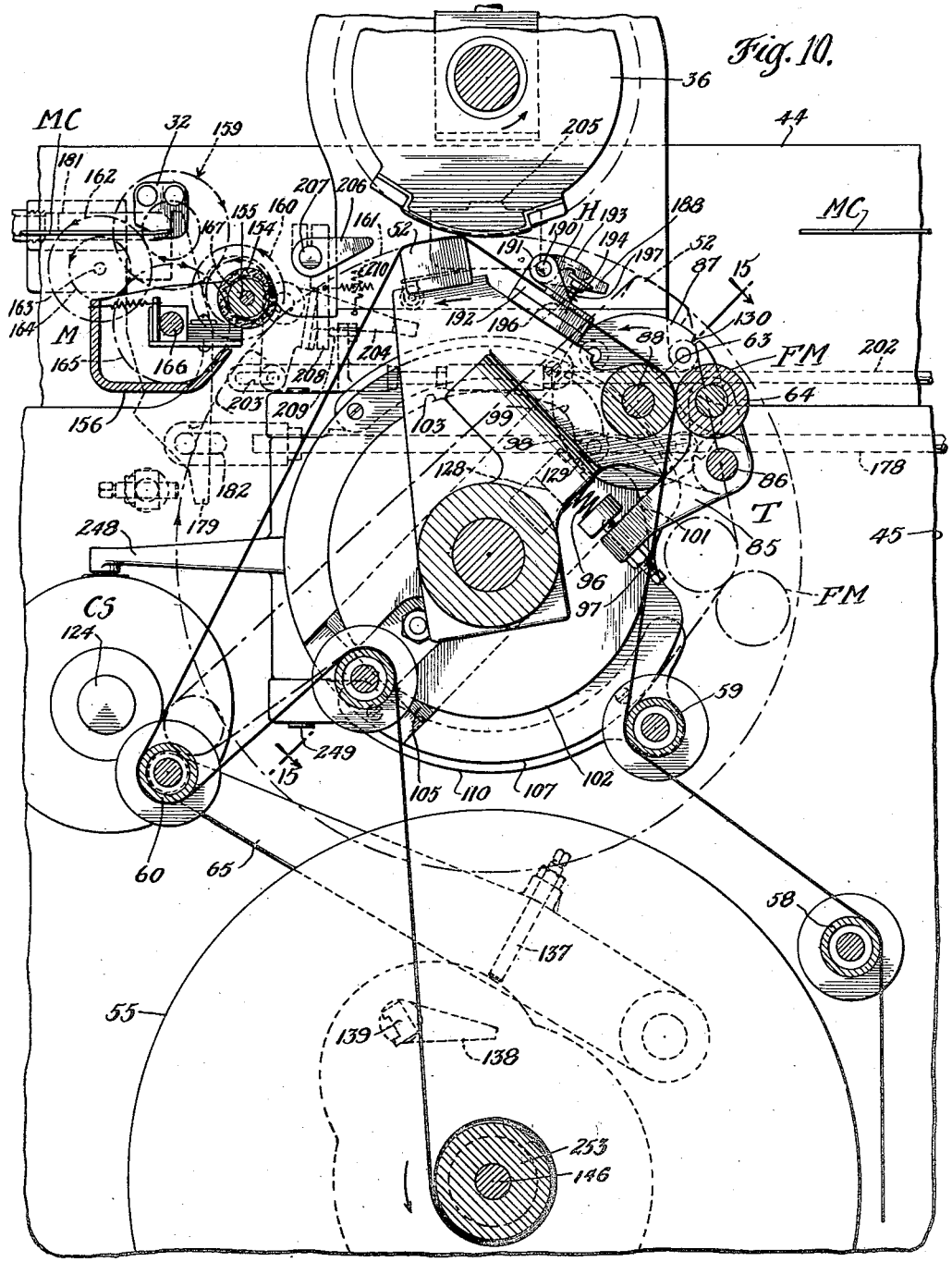
Fig. 10 is a fragmentary longitudinal section taken substantially on the line 10—10 of Figure 12 with the rocker head shown in an intermediate position in full lines and in its right hand position in dot and dash lines.

In Figure 10 the rocker head is shown at an intermediate point in its oscillation to the left in which the drive wheel 87 has been rotated one eighth of a revolution in a counterclockwise direction by the cam roller in the cam track 99 so that paper feed is taking place. As the rocker head continues its movement to the left the cam track causes further rotation of the drive wheel until the roller leaves the track at which time one quarter revolution of the drive wheel is completed.

In Figure 9 the rocker head is shown in its extreme left hand position in which two of the cam rollers 98 are in contact with the concentric portion 103 of the member 102 to again hold the drive wheel against rotation.

As has been pointed out above, when the rocker head oscillates to the right, paper feed does not take place and in order to prevent this I have made provision to close the cam track 99 and to present a concentric surface 104 of the same radius as the concentric surfaces 101 and 103 of the member 102 to the cam rollers 98 in place of the cam track. Thus as the rocker head moves to the right two cam rollers 98 ride the concentric surface 104 and prevent rotation of the drive wheel and strip feed roll. In this connection it will be noted that in Figures 10 and 11 the cam track is shown open and that in Figure 9 it is shown closed.

Referring now to the cam track mechanism in detail and with particular reference to Figures 9, 10, 11, 12 and 15 the cam track is provided by means of a sliding plate 105 mounted in a groove 106 in a mounting plate 107 and by the member 102 above referred to. The member 102 has a cam portion 108 between the concentric surfaces 101 and 103 which as best seen in Figures 11 and 15 constitutes the inner cam surface of the cam track 99 and the sliding plate 105 has a cam portion 109 which constitutes the outer cam surface of the cam track. Thus when the sliding plate 105 is in the position of Figures 11 and 15 the cam track 99 is presented to the cam rollers 98 of the feed roll drive wheel 87. The sliding plate 105 also has the outer concentric surface 104 above referred to so that when the plate 105 is moved to the inner position shown in Figure 9 a complete concentric surface is presented to the cam rollers 98.

The plate 107 is fixedly mounted on arcuate lugs 110 formed on the intermediate frame member 45 by screws 111 and the sliding plate 105 is mounted with freedom for sliding movement in the groove 106 of the mounting plate 107 and between said plate and the member 102. These parts are positioned on the rock shaft 49 as clearly shown in Figures 13 and 15.

The sliding plate 105 is shifted from its cam track forming position to its cam track closing position by a cam 112. This cam has a rearwardly extending sleeve portion 113 by means of which it is rotatably mounted in the frame member 45 and on the rock shaft 49. Suitable bearing sleeves 114 and 115 are provided for this purpose. A compound gear 116 is keyed to the rear end of the sleeve portion 113 and the smaller gear 117 of this compound gear is the driving gear for the cam 112.

As will be seen from Figures 3 and 4 the gear 117 of the transfer unit T¹ receives its drive from a gear 118 secured on the transverse cam shaft 77 and the gear 117 of the transfer unit T receives its drive from the gear 117 of the unit T¹ by means of interconnected gears 119, 120 and 121. The gears 120 and 121 are idler gears rotatably mounted on studs 122 and 123 carried by the frame member 45. The gear 119 is keyed on the shaft 124 of a cam shifter mechanism CS to be described hereinafter. A similar gear 119 meshing with the gear 117 of the transfer unit T is keyed on the shaft 124 of a similar cam shifter mechanism CS associated with the unit T.

The sliding plate 105 has a cam follower 125 which is held in engagement with the cam 112 by a spring 126 extending between the mounting plate 107 and a lug 127 secured on the plate 105 as shown in Figure 15. The mounting plate and the member 102 are suitably slotted to accommodate the cam follower 125.

The sliding plate 105 is also provided with a lug 128 having a tooth 129 adapted to engage in notches 130 in the periphery of the feed roll drive wheel 87 when the wheel is in the intermediate position shown in Figure 10.

Reverting now to the rack actuating cam 76 it will be noted that this cam has portions which cause the rocker head to dwell sufficiently in its extreme left and right hand positions to enable the cam 112 to shift the sliding plate 105. Thus when the rocker head reaches the left hand position of Figure 9 it dwells a sufficient time to enable the cam 112 to shift the plate 105 to close the cam track 99 and present the concentric surface 104 to the cam rollers 98 so that when the rocker head oscillates to the right the feed roll will not be rotated and consequently there will be no feeding of the strip. Similarly when the rocker head reaches the right hand position of Figure 11 it dwells a sufficient time to enable the cam 112 to shift the plate 105 in the opopsite direction to open the cam track 99 so that when the rocker head oscillates to the left the feed roll will be rotated to cause feed of the strip.

Referring now to Figures 3, 11, 18, 19 and 20 it will be seen that brake devices B and BB are associated with the supply reels 54 and take-up reels 55 respectively. When the rocker head is moving from left to right the brake device B of the supply reel 54 is in applied position and the brake device BB of the take-up reel is in released position.

Figure 19:
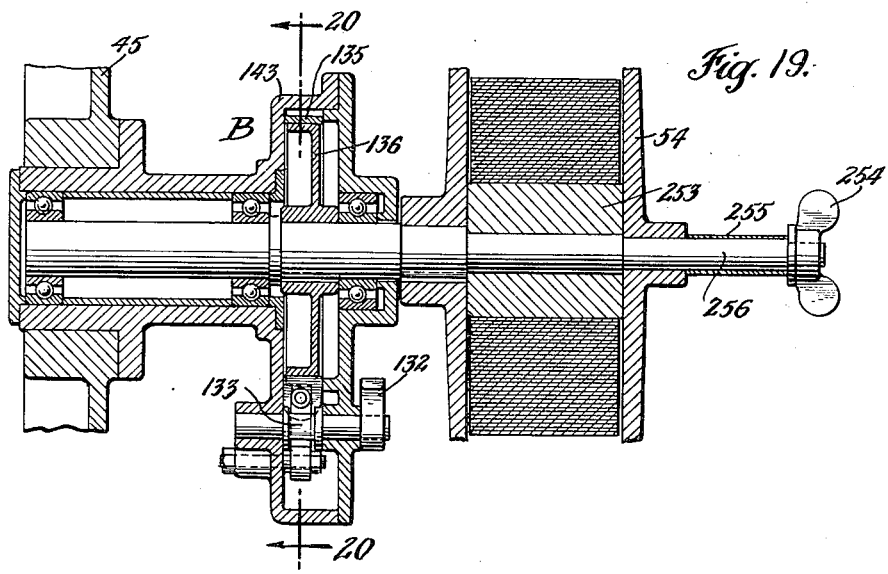
Fig. 19 is a cross section through the lower reel brake mechanism taken on the line 19—19 of Figure 20.
Figure 20:
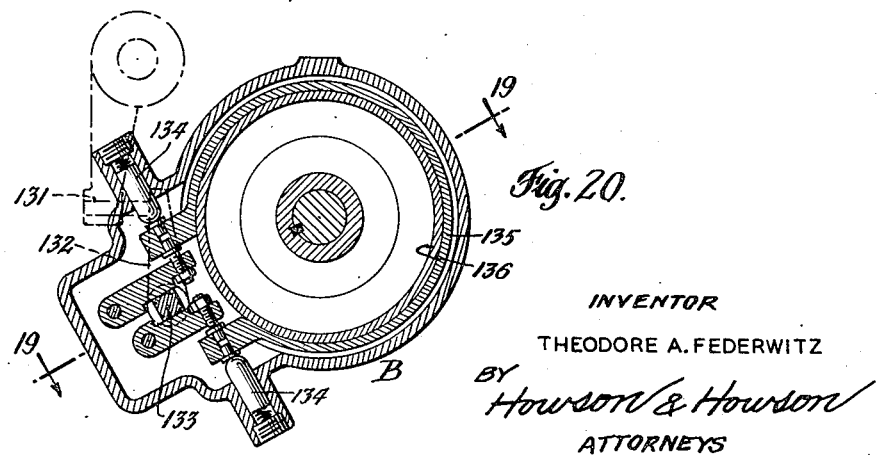
Fig. 20 is a transverse section through the lower reel brake mechanism taken on the line 20—20 of Figure 19.

The brake device B is under control of the lever 62 and the brake device BB is under control of the lever 65. With the rocker heads in their extreme left hand positions as shown in Figure 3 the run of strip between the feed roll mechanism FM and the reel 54 holds the lever 62 in brake applying position. In this position the screw 131 of the lever 62 has not depressed the arm 132 and therefore the brake actuating member 133 is positioned to permit the spring plungers 134, 134 to apply the brake band 135 to the brake drum 136 as shown in Figures 19 and 20. This prevents unwinding of the strip from the reel 54. The brake drum 136 is keyed on the shaft of the reel 54.

Figure 18:
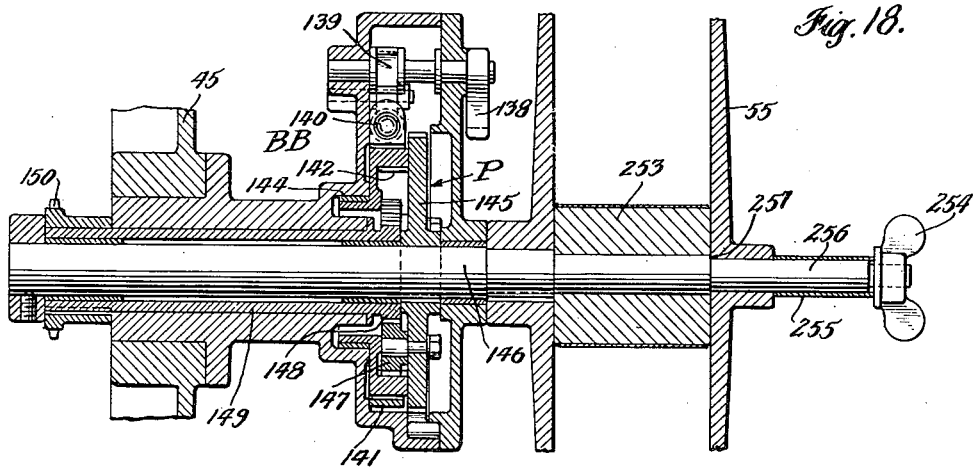
Fig. 18 is a cross section through the upper reel brake mechanism taken on the line 18—18 of Figure 11.

The run of strip between the feed roll mechanism and the take-up reel 55 holds the brake control lever 65 in brake releasing position. In this position the screw 137 of the lever 65 has not depressed the arm 138 and therefore the brake actuating member 139 is positioned to permit the spring 140 to expand the brake band 141 as shown in Figures 11 and 18. This allows the ring gear 142 of the planetary gearing P to rotate idly without rotating the reel 55. In this connection it is pointed out that the planetary gearing P comprises the internal ring gear 142 rotatably mounted in the casing 143 by a bearing 144, the ratchet wheel 145 keyed on the reel shaft 146, and the gears 147 rotatably mounted on the ratchet wheel 145 and meshing with the internal ring gear and with the external gear 148. The external gear 148 is rotatably mounted on the reel shaft 146 by means of its sleeve 149 at the outer end of which a sprocket 150 is keyed.

The sprocket 150 is connected by a chain 151 to a sprocket 152 secured to the gear 119 of the cam shifter mechanism CS. Thus the external gear 148 is driven from the gear 119 and when the brake BB is released the ring gear rotates idly with the result that the reel is not rotated. In order to prevent the strip from being unwound from the reel, pawls 153 are provided to engage the ratchet wheel.

As the rocker head moves toward the right the control lever 65 of the upper brake swings upwardly but the strip does not unwind because of the pawls 153. Also during this movement the control lever 62 of the lower brake swings downwardly but the brake remains applied.

As the rocker head moves toward the left the run of strip leading from the lower reel to the feed roll mechanism FM is put under tension and the control lever 62 swings upwardly and releases the lower brake B to enable the feed roll mechanism to effect feed of a predetermined amount of strip. By the time the rocker head has reached the end of its left hand stroke the lever 62 has again swung down to apply the brake B.

It is pointed out that if the lower reel should spin, because of the release of tension on the strip when the brake B is released, and unwind more strip than the predetermined amount fed by the feed roll mechanism the excess will be taken up the next time the feed roll mechanism acts to feed the strip.

Feeding of the strip develops slack in the run of strip leading from the roll mechanism to the take-up reel 55 and this causes the control lever 65 of the upper reel brake BB to swing downwardly to apply the brake. The reel then rotates and winds up the slack whereupon the lever 65 swings upwardly to again release the brake. Thus when the rocker head has reached its extreme left hand position the upper brake is in released position and the lower brake is in applied position.

Referring now to the moistening apparatus M it will be seen that when the rocker head has moved to the right an amount to bring the anvil 52 under the moistening apparatus M the moistening roll 154 is automatically applied to the area of the strip to which printed matter is to be transferred so as to moisten this area with a solution preferably containing alcohol as the major ingredient. The moistening apparatus as best seen in Figures 4 and 10 comprises the moistening roll 154 having a shaft 155 journalled in the side walls of a liquid containing pot 156 pivotally mounted on a bracket 157 supported from the cross frame member 158. The shaft 155 is driven by means of a train of gears 159, the first gear 160 of which meshes with the larger gear 161 of the compound gear 116 and the last gear 162 of which is keyed on a cross shaft 163 extending from the rear frame member 44 to a point adjacent the pot 156 and carrying a gear 164 at this end. The gear 164 meshes with a gear 165 mounted for free rotation on the pivot shaft 166 of the pot. The gear 165 meshes with a gear 167 keyed on the moistening roll shaft 155. A felt wiper pad 168 is pivotally mounted on the pivot shaft 166 and is kept in spring contact with the roll 154 to wipe liquid evenly over the surface of the roll.

When the anvil 52 approaches the moistening apparatus, a cam 169 secured on a shaft 170 journalled in the frame member 47 actuates the moistening apparatus to apply the roll 154 to the strip. The cam is driven from the main drive shaft 171 of the machine through the medium of a worm 172 and worm wheel 173, the main drive shaft 171 being connected to a suitable source of power such as an electric motor. The main drive shaft 171 is coupled by means of a coupling 174 to the worm drive 84 of the cam shaft 77 above described.

Connection from the moistening apparatus cam 169 to the moistening apparatus M is made by lever and link connections including a bell crank lever pivoted in the frame 47 at 175 having a lower cam follower arm 176 shown in Figure 3 as riding on the high dwell of the cam 169, and an upper arm 177 connected by a link 178 with the rocker arms 179 secured on the pivot shafts 166 of the moistening pot 156.

The cam 169 is so timed with relation to the rocker head actuating cam 76 that when the anvil 52 is under the moistening roll 154 the arm 176 of the bell crank will ride into the low dwell 180 of the cam to rock the rocker arms 179 in a direction to apply the mounting roll to the strip. In this connection it is pointed out that the cam follower arm 176 is maintained in contact with the cam by means of a spring urged plunger 181 associated with the rocker arm 179 and that slots 182 are provided in the link 178 to permit limited over travel of the link.

The low dwell 180 of the cam is of short duration just sufficient to keep the moistening roll in contact with the strip for the length of time required to moisten only an area of the strip sufficient for the transfer of the amount of data on the master cards.

As the rocker head 48 continues its movement to the right the anvil 52 moves to the transfer station where it registers with the pressure face of the pressure drum 36 as shown in Figure 2. By this time the gripper conveyor C has moved a master card to a position in which the printed matter to be transferred is at this station with the master card located between the pressure face of the drum and the portion of the strip on the anvil 52. Upon continued movement of the rocker head, transfer is completed, and as the head approaches the end of its right hand stroke the cam lobe 183 of a shiftable cam 184 splined on the sleeve 113 of the cam 112 engages the cam follower 185 of the lower arm 186 of a bell crank lever and rocks the bell crank lever in a direction to cause its upper arm 187 to engage the trip finger 188 of the hole punching device H. The bell crank lever is pivoted on a stud 189 mounted on the frame member 45. The trip finger is secured on a rock shaft 190 mounted in the ears 191 of the base 192 of the punching device. The rock shaft 190 carries a trigger 193 which engages the head of the punch 194. The paper strip is passed between the stripper plate 195 and the die plate 196 and after the hole is punched by depressing the trip fingers 188 the trip finger is returned to its normal position by means of the spring 197 of the punch.

When the rocker head reaches the end of its stroke to the right, it hesitates before going into its stroke to the left and during this hesitation the sliding plate is moved to track opening position under influence of the cam 112.

It is to be observed that during the initial movement of the rocker head to the right of the tell-tale cam 198 (Figures 3 and 4) secured on the shaft 170 of the cam 169 was rotated and the cam follower arm 199 of a second bell crank lever mounted on the pivot stud 175 entered the low dwell 200 of the tell-tale cam 198 thus moving the upper arm 201 of this bell crank lever to the right to pull on the link 202. The link 202 has lost motion slot connection at 203 with the actuating levers 204 for the tell-tale switches 205 of the master card detectors of the transfer units T and T¹.

Referring particularly to Figures 10, 21, 22, 23 and 24 these card detectors each comprise a detector finger 206 keyed on a shaft 207 and positioned underneath the master card so that when a card is positioned over the finger it will contact the card when it is moved upwardly. The shaft 207 is suitably supported for rocking movement in the framework of the machine and extends from the line of run of the master cards to a point beyond the rear frame member 44 at which end a downwardly extending arm 208 is secured. The arm 208 is associated with the actuating lever 204. When a card is present the arm 200 assumes the position shown in Figure 21.

Assuming now that a master card is present adjacent the transfer station and that the cam 198 has rotated to the position shown in Figure 21 in which the link 202 is pulled to the right, then the abutment screw 209 carried by the link is moved away from the arm 208 and at the same time the lever 204 moves, under influence of the spring 210, until its shoulder 211 abuts the shoulder 212 of the arm 208. The link, however, continues in its full movement to the right because of the lost motion slot 203. Since the arm 208 prevents full swing of the lever 205, the switch arm 213 is not moved to switch closing position, and the machine continues in its normal operation.

As the cam 198 continues to rotate, the cam follower arm 199 of the bell crank lever is raised by the high dwell of the cam and the upper arm 201 moves to the left taking up the lost motion slot 203 and rocking the lever 204 to the position shown in Figures 10 and 23, and also holding the arm 208 and detector finger 206 in the position shown.

If it is assumed now that the next card to reach the transfer station is one of the special master break cards MCB, as shown in Figure 22, then as the link 202 moves to the right under influence of the low dwell 200 of the cam 198 the abutment screw 209 moves away from the arm 208 and allows the detector finger 206 to pass upwardly through the slot 42 in the card MCB. This causes the shoulder 212 of the arm 208 to move out of the path of the shoulder 211 of the lever 204 with the result that the lever 204 is spring pulled to the position shown. This moves the switch arm 213 to switch closing position with the result that the solenoid 214 is energized as will be seen from the wiring diagram of Figure 5.

Before describing the function of the solenoid 214 it is pointed out that as the cam 198 continues to rotate, the cam follower arm 199 runs on the high dwell of the cam 198 with the result that the link 202 restores the lever 204, the arm 208 and the detector finger 206 to their normal positions as shown in Figure 23.

I also provide automatic counter mechanism CM for counting the number of addresses transferred to the strip but since the two transfer units T and T¹ transfer the same number of addresses to the strips I only employ such counter mechanism in association with one of the units, preferably the first unit.

The counter 215, of any well known type, is connected by lever 216 and link 217 to the lever 218 secured to rock shaft 219. A lever 220 secured on the other end of the rock shaft 219 is connected to the core of the solenoid 221 by a link 222. A spring 223 returns the core to normal position when the solenoid is de-energized.

The solenoid is controlled by a normally closed switch 224 mounted next to the tell-tale switch 205 and a normally open switch 225 controlled by a cam 226 secured on the cam shaft 124 to which rotation is imparted by the gear 119 (see Figure 13).

The switch arm 227 of the switch 224 is actuated by the lever 204 in the same manner as the arm 213 of the switch 205 except that the normally open switch 205 is closed upon actuation of the arm 213 while the normally closed switch 224 is opened upon actuation of the arm 227.

The cam 226 is so timed with relation to the rocker actuating cam that the lobe 228 thereof depresses the actuating arm 229 of the switch 225 to close the switch at the same time the detector mechanism is actuated. It will be seen therefore that if a master card MC is present at the transfer station the switch 224 remains closed and since the switch 225 is closed at that time by the cam 226, a circuit is completed to the counter actuating solenoid 221 as will be seen from the wiring diagram of Figure 5, and a count will be registered on the counter. However, if a special "break" card MCB is present at the transfer station, the switch arm 227 will be actuated in the manner described above in connection with the tell-tale device to open the switch 224. Thus, even though the switch 225 is closed at that time by the cam 226 the counter actuating solenoid will not be energized and therefore a count will not be registered for the special "break" card.

Reverting now to the card detector apparatus it is pointed out since the special cards MCB are employed for merely printing or transferring a "break" line onto the strip between two successive addresses to indicate changes of towns or localities. I have provided means, including the solenoid 214 above referred to, to enable printing of the "break" line in the same manner as the printing of the addresses but without advancing the strip after such printing and without operating the hole punching device H. If the strip were advanced when printing the "break" lines, there would be resultant blank spaces at these points in the strips, which, in the particular machine illustrated, would be one inch long. If this were permitted, one inch blank strips would be pasted on some of the magazines or the like being handled in the cutting and pasting machine through which the strips are run after leaving the present machine.

The cam shifter mechanism CS which I have provided to prevent this comprises the solenoid 214, a one revolution clutch device 230, and shiftable cams 184 and 231 controlled by the clutch device 239.

The clutch device includes a body member 232 mounted for free rotation on the shaft 124, an end disc 233 keyed on the shaft 124, a ring 234 secured to the disc 233 and having an internal notch 235 therein, a rocking dog 236 mounted in the body member 232 and a cylindrical cam 237 secured to the body member.

When the machine is operating normally the solenoid 214 is de-energized and the clutch trip arm 238 assumes the position shown in Figures 3, 13 and 23 in which the outwardly extending arm 239 of the dog 236 is in engagement with the cushioned stop 240 of the trip arm 238. A spring pressed pawl 241 engaging a notch 242 in the periphery of the clutch body member 232 is provided to prevent backward movement thereof.

The dog 236 is shouldered to provide a curved surface 243 struck from the same center as the internal surface of the ring 234 and in contact therewith, so that when the dog is in the position of Figure 23, the disc 233 and ring 234 rotate freely with respect to the body member 232 and cam 237 of the clutch device.

However, when the solenoid is energized due to the presence of a special card MCB at the transfer station as above described, the trip arm 238 is rocked to the position shown in Figure 25 and moves away from the arm 239 of the rocking dog 236. The dog 236 is provided with a tail 244 which is engaged by a spring loaded plunger 245. When the ring 234 rotates to bring the notch 235 into registry with the dog 236 the plunger 245 rocks the dog so that the shouldered portion enters the notch as shown in Figure 25. Then as the ring continues in its rotation the clutch body 232 and the cylindrical cam 237 rotate with it.

The cam 237 has a cam groove 246 in which the cam follower 247 of a lever 248 rides. The lever 248 is pivoted on the frame of the machine at 249 and has a forked end carrying rollers 250 which ride in the annular groove 251 of the member carrying the cam 184, the cam lobe 183, and the cam 231.

The cylindrical cam 237 is so timed with relation to the cam 76 and the cams 184 and 112 that the cams 184 and 231 are shifted by the lever 248 just before punching of the holes takes place. This shifting of the cams shifts the cam lobe 183 of the cam 184 laterally an amount that it will clear the cam follower 185 and presents a circular surface to the follower 185 so that the punch will not be tripped. At the same time the cam 231 shifts into the path of the cam follower 125 of the sliding plate 105 and presents its circular surface to the follower, thus holding the sliding plate in its track closing position.

When the rocker head then moves in its stroke to the left, the feed roll drive wheel 87 will not be rotated and paper feed will not occur. By the time the rocker head has reached the end of its left hand stroke the clutch device 230 will have completed its revolution and the cams will be shifted back to their normal positions.

It is pointed out that the solenoid 214 is only energized for a short period of time and therefore shortly after the clutch has been tripped, the solenoid is de-energized and the trip arm 238 moves back to the position of Figure 23 under influence of the spring loaded plunger 252. When the clutch has made its revolution the arm 239 engages the cushioned stop 240 of the trip arm 238 and the pawl 241 engages the notch 242.

As has been mentioned above, the machine is adapted for use with strips of the same width in both units or with a wider strip in one of the units as illustrated in Figure 4. To accomplish this, the rolls 63 and 64 of the feed roll mechanism FM and the various guide rolls for the strip are of a width sufficient to accommodate the wider strip. The reels have been made adjustable as to width in a simple manner as can be seen from Figure 18 in which the reel is shown adjusted for a narrow strip. The outer disc of the reel is secured against the core 253 by means of the nut 254 and a spacer sleeve 255 on the extended portion 256 of the reel shaft 146. In the case of a wide strip the spacer sleeve 255 is pushed against the shoulder 257 of the shaft extension 256 and a core of proper width is positioned on the shaft and sleeve. Then the outer disc is secured against the core and the nut is screwed against the hub of the outer disc.

I also contemplate employing a wide strip such as shown in the second $T^1$ of Figure 4 in both transfer units. If it is desired, when employing wide strips in both units, to extend the printing over the full width of the strips, master cards of corresponding width are employed and a moistening device having a wider moistening roll is employed. Punched holes can be located centrally of such wider strips by properly adjusting the location of the punch and die.

I claim:

1. In a continuous automatic duplicator for transferring data from master cards to a strip, the combination with mechanism for moving the cards in succession through a pre-determined transfer station, of an oscillatory head constituting a support for said strip, take-up and supply reels for the strip supported independently of said head and operatively associated with the strip at opposite sides respectively of said head, means for oscillating the head to bring the strip intermittently into transfer relation to the cards at the said station, mechanism including feeding elements carried by the head for intermittently feeding the strip longitudinally through the head so as to present different areas of the strip to the cards for the respective transfer operations, and means responsive to the movements of the head in one direction only of its oscillatory movement for actuating said elements, said actuating means comprising a cam relatively fixed with respect to the head, a rotary actuator for the feeding elements carried by the head and in constant operating engagement with the cam whereby the cam operates to rotate the actuator in response to the oscillatory movement of the head, and means for rendering the cam inoperative to rotate the said actuator in one direction of the oscillatory movement of the head.

2. A duplicator according to claim 1 wherein the cam comprises a groove and the said rotary element has a plurality of pins for successive engagement with the cam groove, and wherein further means is provided on the cam for closing the groove to exclude the pins, together with means synchronized with the oscillations of the head for actuating said cam-closing means to exclude the pins from the groove during the movements of the head in one direction of the oscillatory movement, whereby oscillation of the head results in an intermittent rotation in a single direction of the rotary element.

3. In a continuous automatic duplicator for transferring data from master cards to a strip, the combination with mechanism for moving the cards in succession through a predetermined transfer station, of an oscillatory head constituting a support for said strip, take-up and supply reels for the strip supported independently of said head and operatively associated with the strip at opposite sides respectively of said head, means for oscillating the head to bring the strip intermittently into transfer relation to the cards at the said station, mechanism for intermittently feeding the strip longitudinally through the head so as to present different areas of the strip to the cards for their respective transfer operations, and strip actuated means for controlling rotation of the reels, said rotation controlling means comprising a normally applied brake for the delivery reel, and means responsive to tension in the strip between the reel and the oscillatory head for releasing said brake.

4. In a continuous automatic duplicator for transferring data from master cards to a strip, the combination with mechanism for moving the cards in succession through a predetermined transfer station, of an oscillatory head constituting a support for said strip, take-up and supply reels for the strip supported independently of said head and operatively associated with the strip at opposite sides respectively of said head, means for oscillating the head to bring the strip intermittently into transfer relation to the cards at the said station, mechanism for intermittently feeding the strip longitudinally through the head so as to present different areas of the strip to the cards for their respective transfer operations, and strip actuated means for controlling rotation of the reels, said rotation controlling means comprising a planetary transmission unit including a driving element normally free from the take-up reel and a driven element permanently connected to said reel, a normally released brake element for operatively connecting the driving element to the reel by way of the said driven element, and means responsive to development of slack in the strip between the take-up reel and the oscillatory head for applying said brake element.

5. A duplicator according to claim 4 including means for preventing a reverse strip-releasing rotation of the take-up reel.

6. In a continuous automatic duplicating machine for transferring data from master cards to a strip, the combination with mechanism for moving the cards in succession through a predetermined transfer station, an oscillatory head supporting said strip and mechanism for oscillating the head to bring the strip intermittently into transfer relation to the cards at said station, take-up and supply reels for the strip supported independently of said head and operatively associated with the strip at opposite sides respectively of the head, mechanisms synchronized with the oscillatory movement of the head for moistening an area of the strip, for pressing a card against the moistened area to effect the transfer, and for perforating the strip between adjoining transfer areas, means for actuating said moistening, pressing and perforating mechanisms, all in one direction of the oscillatory movement of the head, and mechanism for longitudinally feeding the strip through the head to a predetermined extent during each movement of the head in the opposite direction.

7. In a continuous automatic duplicating machine for transferring data from master cards to a strip, the combination with mechanism for moving the cards in succession through a predetermined transfer station, of a delivery and take-up reel for said strip, an oscillatory head mounted independently of the reels and guiding a loop of the strip intermediate the reels whereby the head is free to oscillate without affecting the length of the strip extending between the reels, an anvil on the head operative when the head moves in one direction of oscillation to present the strip to the transfer station for a transfer operation, means operative when the head moves in the opposite direction to longitudinally advance the strip on the reels and in the head so as to bring another area of the strip into position for a succeeding transfer operation, and means for throwing the strip advancing means out of operation selectively during certain movements of the head in the said opposite direction, said means including control mechanism responsive to predetermined master cards as the latter approach the transfer station.

References Cited in the file of this patent

UNITED STATES PATENTS

| | | |
|---|---|---|
| 859,837 | Philippi | July 9, 1907 |
| 977,830 | Ovenshire | Dec. 6, 1910 |
| 1,150,784 | McMillan | Aug. 17, 1915 |
| 1,889,250 | Kohnle | Nov. 29, 1932 |
| 1,913,890 | Krell | June 13, 1933 |
| 2,005,738 | Foster | June 25, 1935 |
| 2,103,654 | Weimont | Dec. 28, 1937 |
| 2,262,250 | Ralston | Nov. 11, 1941 |
| 2,280,095 | Metzner | Apr. 21, 1942 |
| 2,282,737 | Mills | May 12, 1942 |
| 2,340,819 | Mills | Feb. 1, 1944 |
| 2,552,869 | Sauerman | May 15, 1951 |
| 2,589,789 | Ford | Mar. 18, 1952 |
| 2,598,523 | Federwitz | May 27, 1952 |
| 2,615,390 | Sauerman | Oct. 28, 1952 |
| 2,619,899 | Gollwitzer | Dec. 2, 1952 |
| 2,627,805 | Reitfort | Feb. 10, 1953 |